(12) United States Patent
Yuen

(10) Patent No.: US 9,280,935 B2
(45) Date of Patent: Mar. 8, 2016

(54) MOBILE IMAGE DISPLAYS

(75) Inventor: Paul Anthony Yuen, Hong Kong (CN)

(73) Assignee: Dayton Technologies Ltd., New Territories, Hong Kong (CN)

( * ) Notice: Subject to any disclaimer, the term of this patent is extended or adjusted under 35 U.S.C. 154(b) by 203 days.

(21) Appl. No.: 13/977,752

(22) PCT Filed: Jan. 3, 2012

(86) PCT No.: PCT/IB2012/050021
§ 371 (c)(1),
(2), (4) Date: Jul. 1, 2013

(87) PCT Pub. No.: WO2012/093351
PCT Pub. Date: Jul. 12, 2012

(65) Prior Publication Data
US 2013/0271358 A1    Oct. 17, 2013

(30) Foreign Application Priority Data
Jan. 3, 2011 (HK) .................. 11100013.0

(51) Int. Cl.
G09G 3/34 (2006.01)
G02B 27/01 (2006.01)
G02F 1/1335 (2006.01)
F21V 8/00 (2006.01)

(52) U.S. Cl.
CPC .......... *G09G 3/3406* (2013.01); *G02B 27/0101* (2013.01); *G02B 6/002* (2013.01); *G02F 2001/133618* (2013.01)

(58) Field of Classification Search
CPC .................................................... G02B 27/017
See application file for complete search history.

(56) References Cited

U.S. PATENT DOCUMENTS

| | | | |
|---|---|---|---|
| 6,795,137 B1 * | 9/2004 | Whitted et al. | 349/68 |
| 7,430,349 B2 * | 9/2008 | Jones | 385/115 |
| 2004/0004584 A1 * | 1/2004 | Hebert | 345/8 |
| 2007/0041589 A1 * | 2/2007 | Patel et al. | 381/73.1 |
| 2010/0001187 A1 | 1/2010 | Fenske et al. | |
| 2012/0188245 A1 * | 7/2012 | Hyatt | 345/428 |

FOREIGN PATENT DOCUMENTS

CN    101782698    7/2010

OTHER PUBLICATIONS

International Search Report for PCT/IB2012/050021 dated May 3, 2012.

* cited by examiner

*Primary Examiner* — Amare Mengistu
*Assistant Examiner* — Shawna Stepp Jones
(74) *Attorney, Agent, or Firm* — Nixon Peabody LLP; Jeffrey L. Costellia

(57) ABSTRACT

A mobile image display apparatus comprising a backlit display device, an ambient light collector, an image forming device for outputting image signals to form images on an image display screen of the backlit display device, and an image viewing chamber defined by an opaque housing; wherein the ambient light collector is for collecting ambient light from exterior surroundings to provide back illumination to the backlit display device.

18 Claims, 10 Drawing Sheets

MOBILE IMAGE DISPLAYS

FIELD OF THE INVENTION

The present disclosure relates to mobile image displays, and more particularly to mobile image displays for outdoor use. This invention also relates to wearable communication apparatus comprising a mobile image display.

BACKGROUND

Mobile image displays are useful to facilitate communication of visual information to a user while the user is on the move. Such image displays are especially useful for users who are doing fast moving sports such as cycling, swimming, skiing, paragliding or the like when a high degree of concentration is required.

Conventional sports computers typically include a low-end microprocessor which is typically adapted for processing and storing sporting data and parameters. For example, running computers are adapted for tracking steps and distance jogged or run, bicycle computers are for tracking cycling speed and cadence, swimming computers are for tracking laps and stroke counts and timing, and skiing computers are for tracking skiing speed and distance.

With the ever increasing versatility and miniaturization, coupled with substantial cost reductions, of microprocessors and mobile telecommunications devices, modern mobile sports computers equipped with mobile telecommunications frontends are becoming more portable, more affordable, and therefore more popular. The incorporation of mobile telecommunications devices into modern day sports computers means that more and more information is available and real-time information exchange is also possible. For example, sports computers are now commonly equipped with GPS so that the positional, path and geographical information of a sporting user could be readily available for processing for self- and external-use. Likewise, sports computers are frequently equipped with physiological sensors to capture physiological information such as heart rate, ECG, blood oxygen level, and ambient sensors to capture micro-weather information such as temperature, humidity, brightness or pollutant levels. The locally captured data or information could be combined with external data, such as position, routing, wind speed, wind direction, sun-rise time, sun-set time, high-tide time, low tide time, or other macro-weather information for path planning or scheduling.

For example, instructions could be received from instructors or coaches on the basis of locally captured weather, performance and/or physiological data captured in combination with the external data and then transmitted to sports person for use.

For many sports, especially speed sports, it is desirable that the sports computers include hands-free visual information displays so that a user can view the information display of a sports computer without hand operation to mitigate distraction or interruption.

U.S. Pat. No. 7,192,137 discloses a sports goggle having an information display means which is mounted on a goggle main body. The information display means includes a liquid crystal, a cathode ray tube (CRT), a semiconductor device, a light-emitting diode (LED), an electroluminescence, or a micro-mirror device (DMD). However, as a sports goggle is frequently used under outdoor conditions, the high level of screen illumination required to make images visible means an undesirably high power consumption level which in turn means either an undesirably heavy goggle or undesirably short operating time.

BRIEF DESCRIPTION OF DRAWINGS

Examples of the present invention will be explained below by way of example and with reference to the accompanying drawings or figures, in which:—

DESCRIPTIONS

Figure 1:
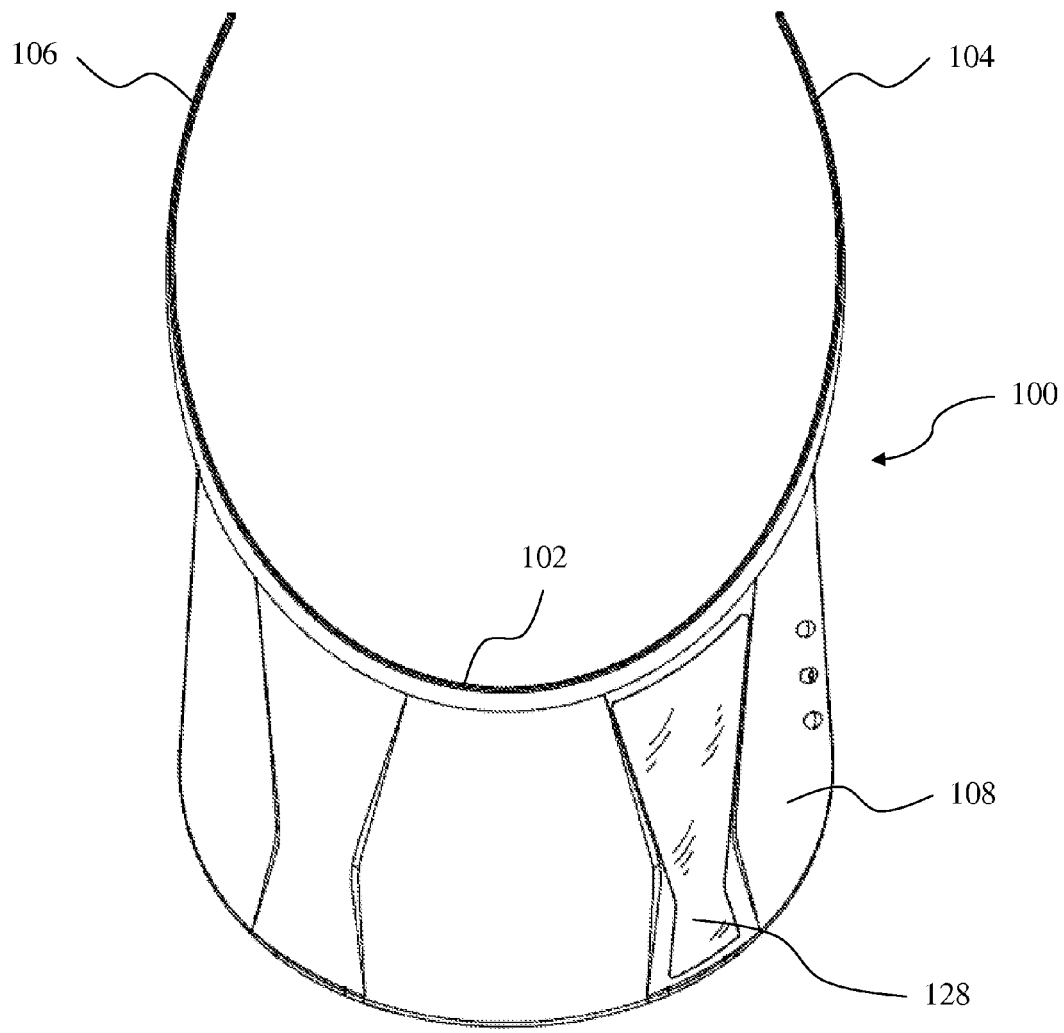
FIG. 1 is a top plan view of a cap mounted with an image display.
Figure 1A:
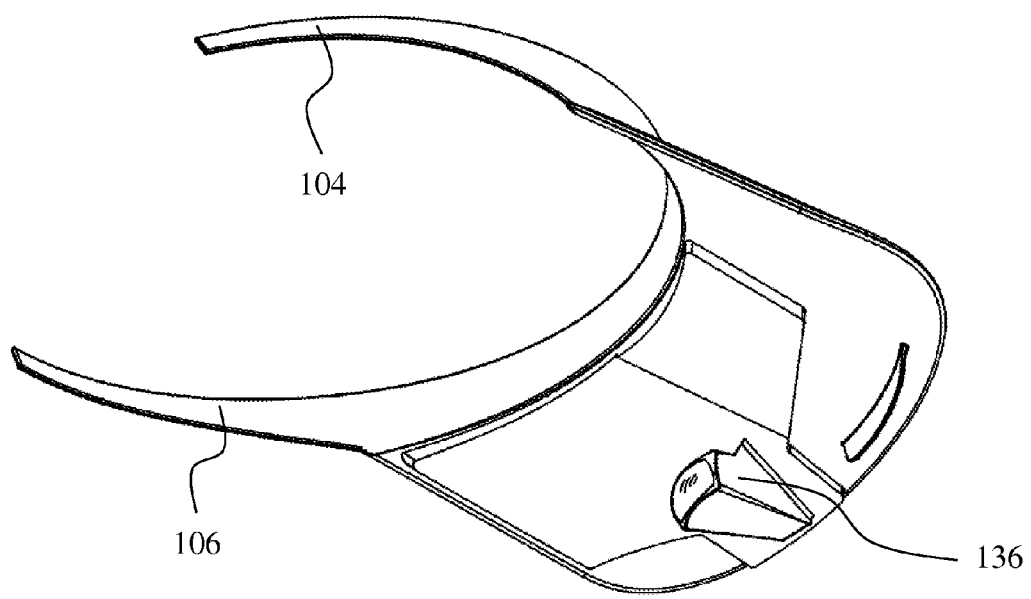
FIG. 1A is a perspective view from below of FIG. 1.
Figure 1B:
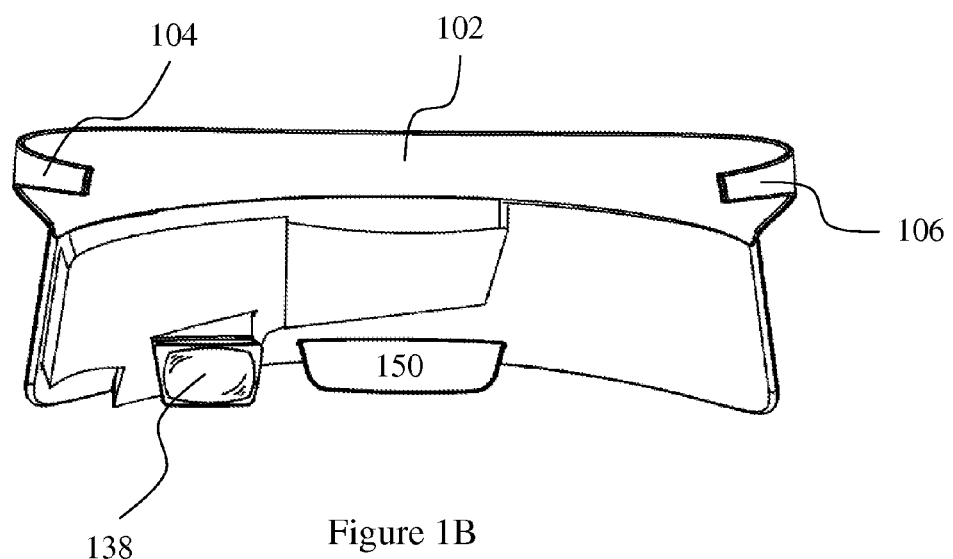
FIG. 1B is a rear elevation view of the cap of FIG. 1.
Figure 1C:
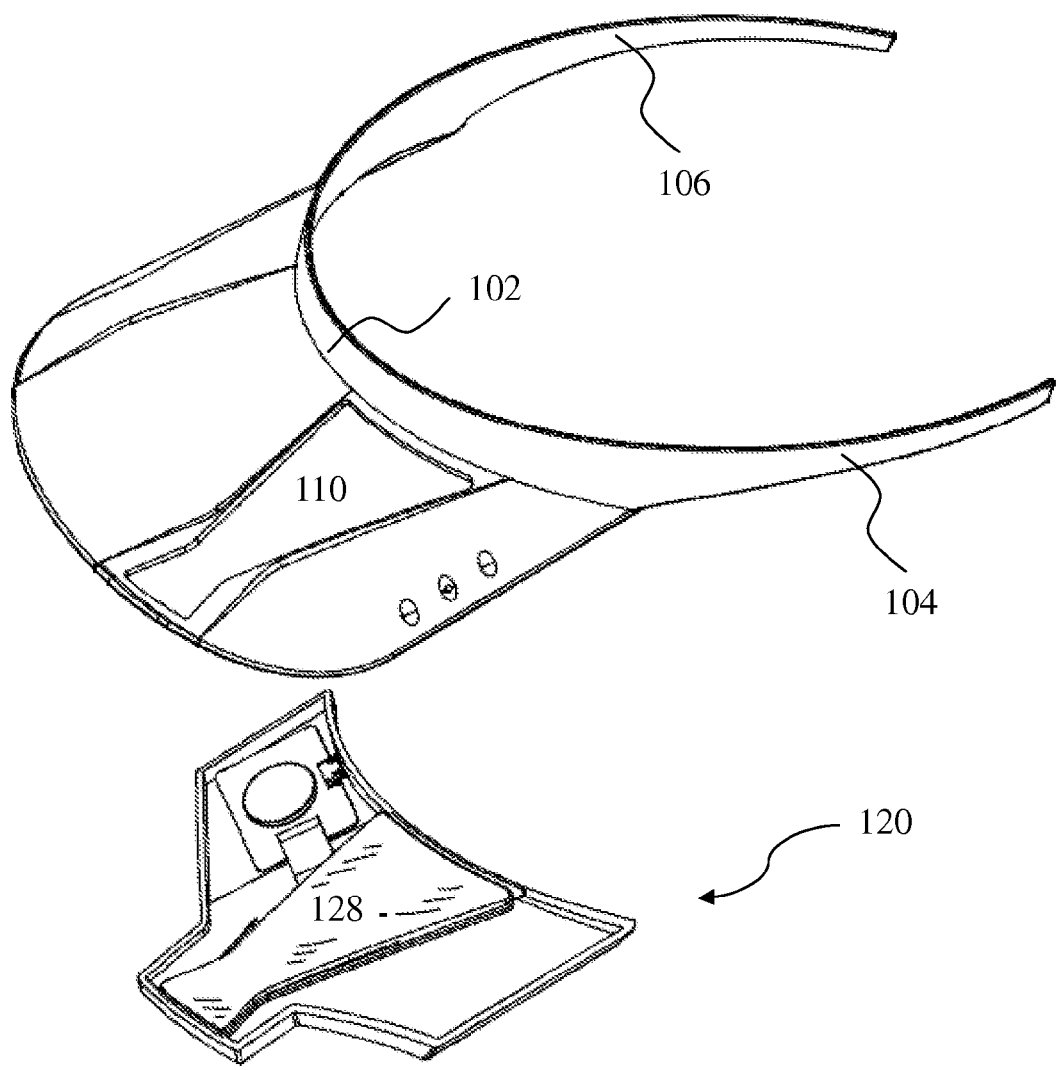
FIG. 1C is an exploded view of FIG. 1.

There is provided a mobile image display apparatus comprising a backlit display device, an ambient light collector, an image forming device for outputting image signals to form images on an image display screen of the backlit display device, and an image viewing chamber defined by an opaque housing; wherein the ambient light collector is for collecting ambient light from exterior surroundings to provide back illumination to the backlit display device. Having an ambient light collector to provide back illumination to the display device means less portable power is required to be carried.

In an example, the viewing chamber provides an optical isolation environment to shield the image display screen of the backlit display device from ambient light of the exterior surroundings. A viewing chamber having an optical isolation environment means a lesser level of back luminance required to make images visible.

The viewing chamber may comprise a tubular portion extending forward of the image display screen to define a viewing end and a viewing axis, the viewing end being mounted with a viewing lens such that images on the image display screen is viewable by a user through the viewing lens when the backlit display device is backlit by the collected ambient light.

In an example, the apparatus comprises a light shade to shade the viewing end of the optical enclosure from the ambient light of the exterior surrounding.

In an example, the light collector comprises a light collection panel, the light collection panel having a light collection surface for collecting ambient light and being of the type that collects light at an incident angle to a light collection surface and conveys the collected light in a direction parallel to the light collection surface.

As an example, the light collection panel may comprise a light conduction layer which is underneath the light collection surface, the light conduction layer comprising light guides for guiding light collected by the light collection surface to move following the profile of the light collection panel and to leave the light conduction layer at a light output end.

As an example, the light guides terminate at an edge of the light conduction layer, the edge of the light conduction layer defining an output end of the light collection panel such that light collected by the light collection surface leaves the light collection panel at a direction tangential to the light output end of the light collection panel.

As an example, the light collection panel tapers towards the light output end to provide a condensed light output for back illumination of the backlit display device.

As an example, the light collection panel forms part of the light shade and is bent at the light collection end to provide back illumination to the backlit display device.

For example, the light collection surface of the light collection panel may be at an acute angle to the viewing axis.

As an example, the light collection surface and the light conduction layer are integrally formed.

The light conduction panel may be a plastic film, such as a polycarbonate film, preferably a flexible plastic film such as a flexible polycarbonate film. Use of a flexible plastic film to form the light conduction panel provides a simple light and compact optical arrangement to capture ambient light to provide backlight.

The light conduction layer may be less than 1 mm thick, for example, between 0.2 mm to 0.5 mm.

In an example, the light conduction layer is arranged to keep the collected ambient light within the light conduction layer by total internal reflection until edge emergence at the light output end.

To improve efficiency, the light conduction layer may be doped with fluorescent coloring agents, the fluorescent coloring agents converting incident light into light of a longer wavelength.

In an example, the opaque housing defines a panel support for holding the light collection panel, the support also defining a light shade to shade the viewing end of the optical enclosure from the ambient light of the exterior surrounding.

In an example, the panel support and the viewing chamber are integrally formed such that the viewing chamber is downwardly dependent from the panel support and overhanging the image viewing chamber.

In an example, the backlit display device may comprise a liquid crystal display screen, such as a negative liquid crystal display.

As an example, the apparatus comprises a wireless frontend for receiving information and a processor executing stored instructions to process the received information for displaying on the image display screen.

As an example or alternative, the apparatus may comprise a lens for collecting information ahead of a user, behind a user or at the sides of a user to provide environmental information at a glance and without turning the user's head.

There is also provided a headwear or an eyewear comprising a mobile image display apparatus according to any of the preceding Claims and a visor for attaching to a user, wherein the mobile image display apparatus is mounted on and/or suspended from the visor.

In an example, the light collector is mounted on the visor with the light collection surface exposing through the visor.

In an example, the image viewing chamber is underneath the visor when worn.

In an example, the image display unit is positioned immediately above the eye-level of a user such that the image display unit does not obstruct normal vision of a user.

In an example, the light conduction layer of the light collector is intermediate the light collection surface and the image display screen.

In an example, the headwear includes a cap, a helmet or hat; and the eye wear includes goggles such as swimming and skiing goggles.

In an example, the backlit display device is adapted for viewing by a proximal eye and the head wear further includes a distal eye vision block which is arranged to block the vision of a distal eye when the eye ball of the proximal is moved to view the display unit.

The distal eye vision block may comprise a light shield which projects downwardly from the underside of the visor, the depth of the light shield being such that the vision of the distal eye is not obstructed until the eye ball of the distal eye is moved upwards in synchronization with the upward viewing movement of the proximal eye ball.

Features of the apparatus will be explained with reference to the embodiments below.

Figure 2:
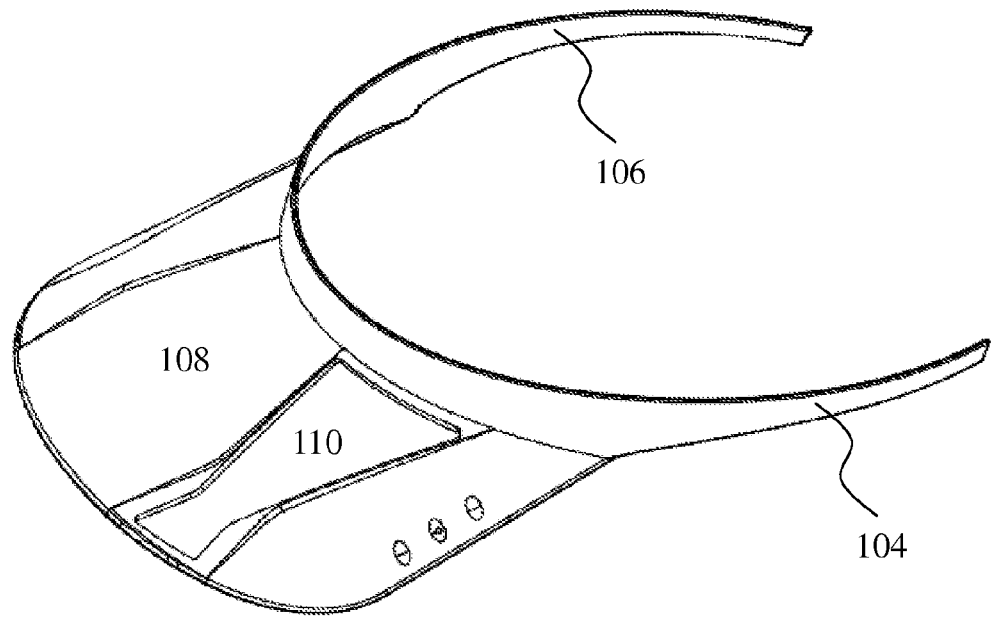
FIG. 2 is a perspective view of a cap of FIG. 1 without the image display and other attachments.

A wearable communication apparatus 100 depicted in FIGS. 1, and 1A to 1C comprises a cap, a communication frontend device and an image display assembly. The cap, as an example of a head wear as shown in more detail in FIG. 2, comprises a head mount portion and a visor portion which projects forward of the head mount. The head mount portion is integrally mounted of hard and resilient plastics and comprises a forehead portion 102 which is intermediate a first arm portion 104 and a second arm portion 106. The forehead portion, the first arm and the second arm are integrally moulded and shaped to follow the contour of the head of a user so that the apparatus can be worn and retained on the head of a user when the user is doing motion sports such as cycling, snow skiing or water skilling.

The visor portion 108 comprises a rigid or semi-rigid shading projection which extends forward of the forehead portion of the head mount to provide shielding against ambient sunlight, especially overhead or head-on sunlight. The visor portion 108 is integrally moulded of an opaque or translucent plastic material and includes a first receptacle for housing a light collection panel and a second receptacle for housing the base portion of an eye mask.

The image display assembly 120 comprises a display panel 122 of liquid crystal display ('LCD') cells, a backlight arrangement for providing back-illumination to the display panel, and image processing circuitry for forming image on the display panel. The backlight arrangement comprises a light collection panel 124 for collecting ambient light and concentrating same for output, and a light guide 126 to couple and forward the light collected and concentrated by the light collection panel 124 to the display panel. The image forming circuitry is powered by a button battery, for example, a CR2032 battery, and comprises an image processor which executes instructions stored in a memory device to convert information received wirelessly from an external data source into textual or graphical representations for display on the display panel.

Components of the image display assembly are held in place by a rigid plastic moulded housing 130. The rigid plastic housing comprises an upper portion which is adapted for mounting onto the visor portion, and a lower portion which is downwardly dependent from the upper portion and which defines an image viewing compartment. The upper portion comprises a base plate member 132 having lateral portions which extend sideways from the receptacle and a forward end portion which projects from between the two lateral portions. An aperture 134 is formed on the forward end portion to permit through passage of an output end of the light collection panel. An upper peripheral rim comprising an upstanding wall is formed around the outer periphery of the upper portion. The upstanding wall has a profile which follows the contour of the visor to define a circuitry holding compartment when the image display assembly is attached to the visor portion when the upper portion of the rigid housing is fastened to the lower surface of the visor.

The light collection panel 124 is mounted on the upper portion of the visor intermediate the two lateral portions and is covered by a protective cover 128. The light collection panel is exposed to ambient light through a window defined by the receptacle 110 on the visor when the image display assembly is fastened onto the visor. A printed circuit board 140 carrying the image forming circuitry and the battery 142 is mounted in the circuitry holding compartment, and a signal cable 144 passes the aperture on the forward end portion of the rigid housing to interconnect the image forming circuitry and the display screen.

The image viewing compartment comprises an optical compartment which is substantially a dark chamber so that image formed on the display panel can be viewed through the viewing lens even with a weak backlight. The optical compartment includes an opaque tubular portion 136 which extends from an end of the forward end portion most distal from the head mount towards the user and which encloses the light guide and the display panel. The opaque tubular portion 136 defines a viewing axis and the display screen is mounted on the viewing axis with the light guide 126 providing backing from behind. A viewing lens 138 is placed at an end of the tubular portion most proximal a user to facilitate image viewing by a user.

To facilitate wireless data communication so that the cap and the image display assembly can function as a mobile data communication and display apparatus, a microprocessor operated wireless communication frontend device is also formed on the printed circuit board. The wireless communication frontend device may be a GPS frontend or a mobile telecommunications frontend complying with 2G, 3G or LTE standards for receiving external data such as geographical or position data, instructions, path or tactics recommendations and/or rivalry information. The image forming circuitry and the wireless communication frontend can use a single processor.

Figure 3:
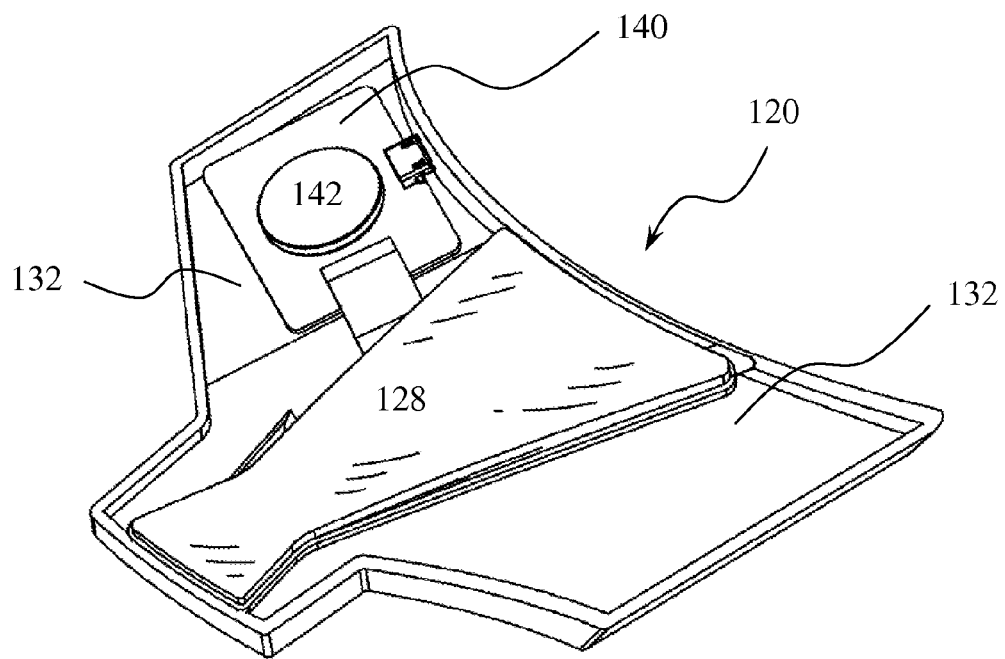
FIG. 3 is a perspective view from above of an image display assembly of the cap of FIG. 1.
Figure 3A:
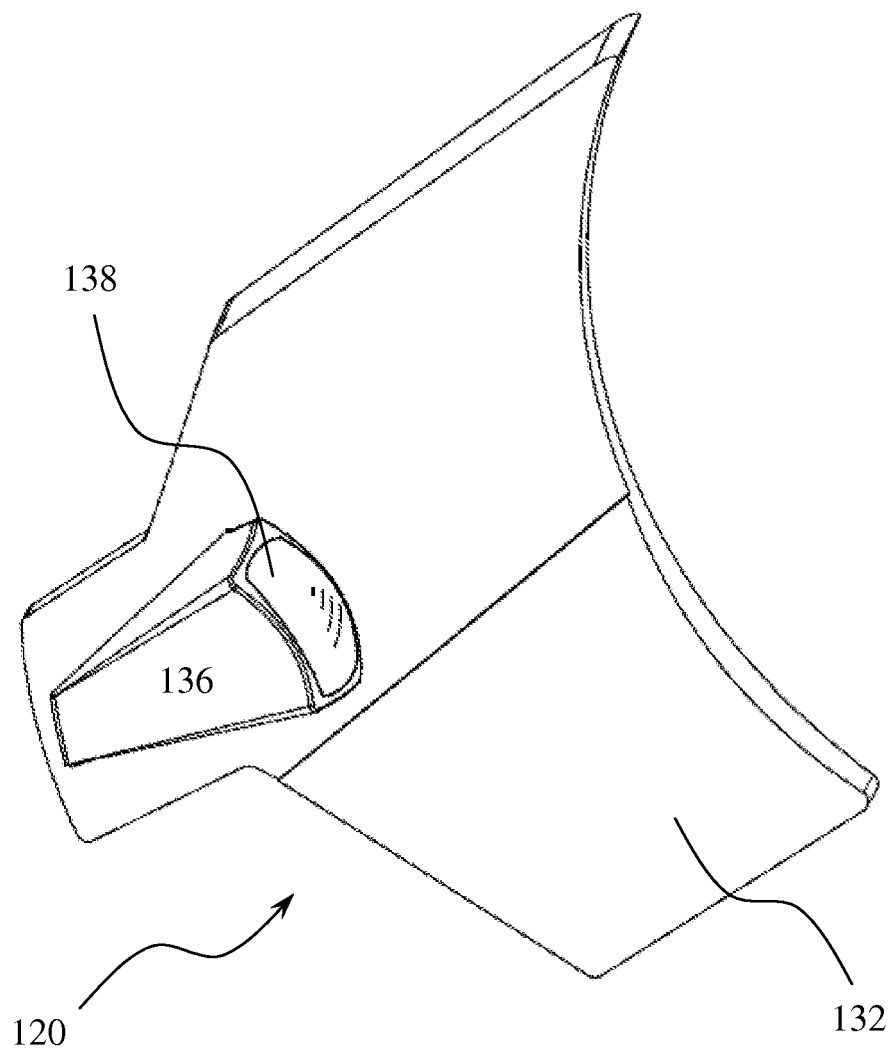
FIG. 3A is a perspective view from below of FIG. 3.
Figure 3B:
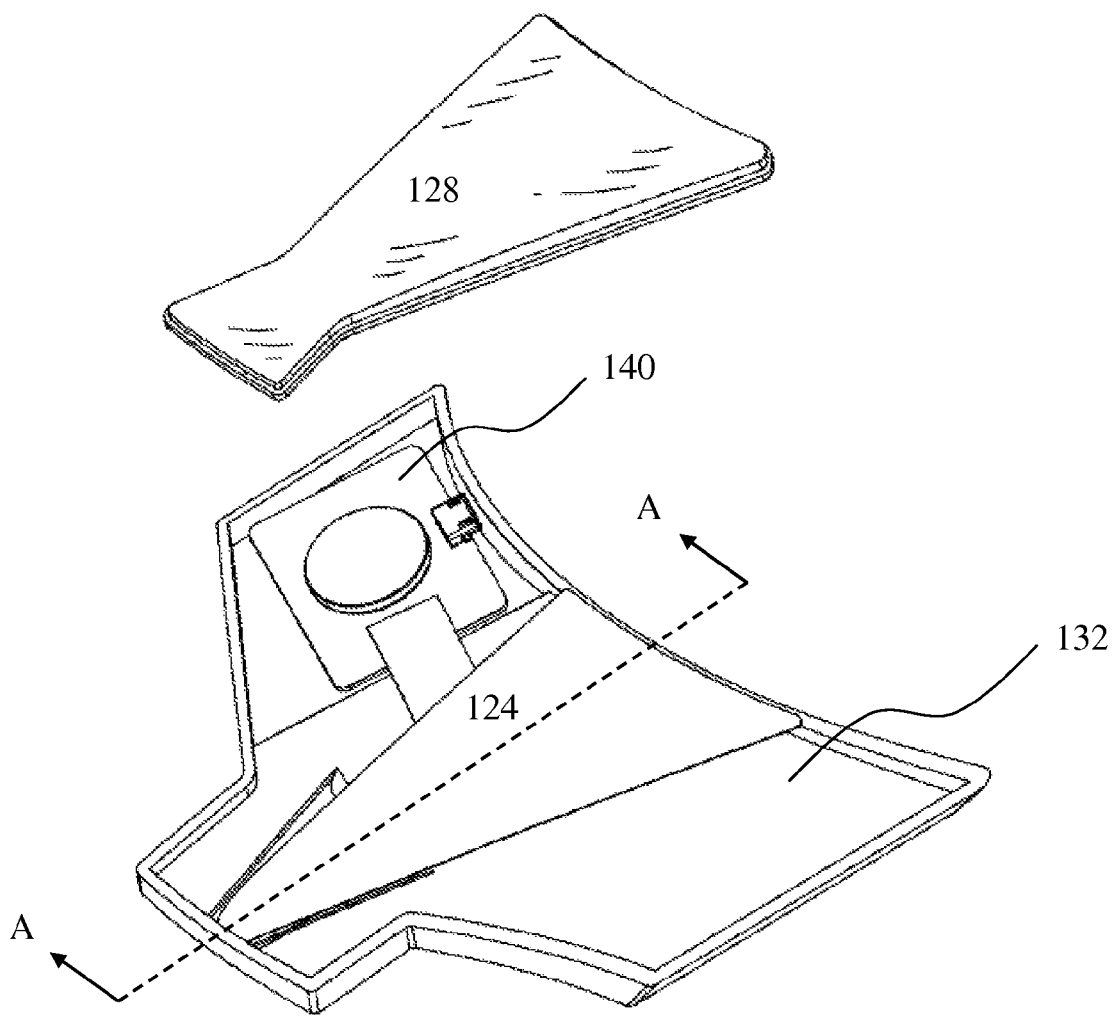
FIG. 3B is a first exploded view of the image display assembly of FIG. 3.
Figure 3C:
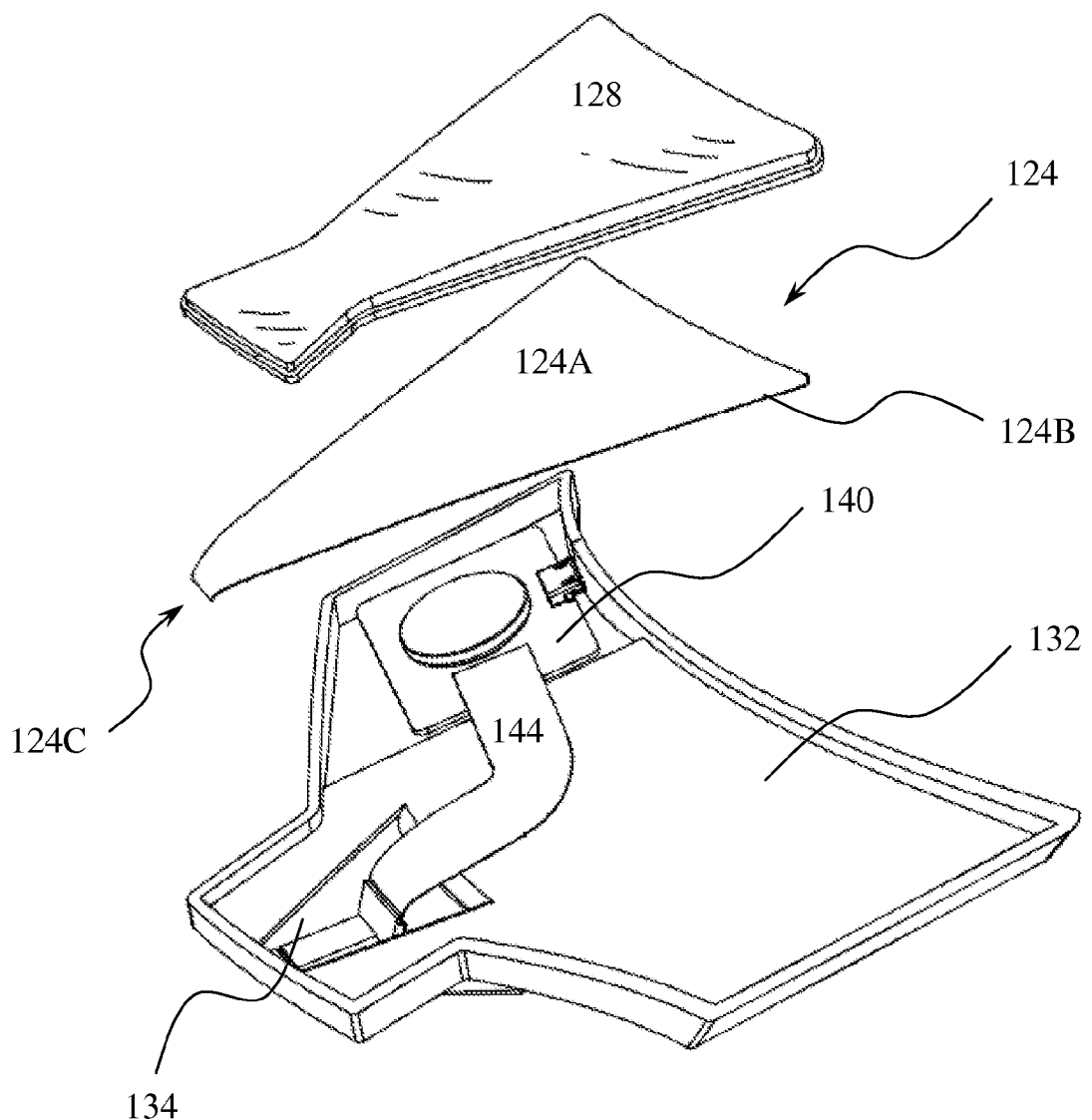
FIG. 3C is a second exploded view of the image display assembly of FIG. 3.
Figure 3D:
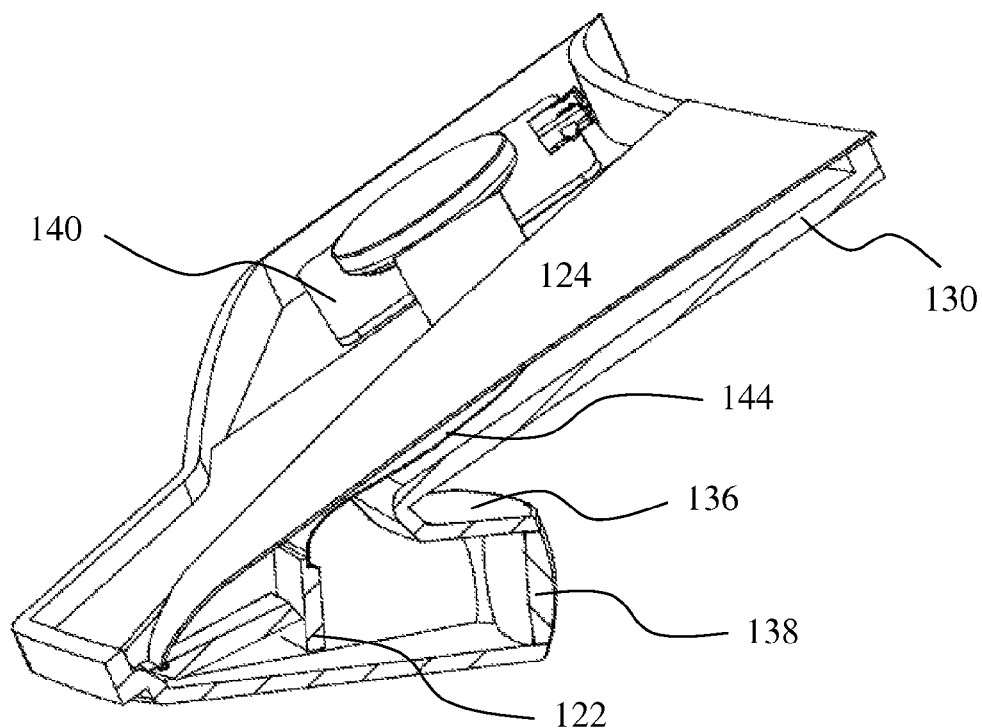
FIG. 3D is a cross-sectional view of the image display assembly of FIG. 3B taken along the line A-A.
Figure 3E:
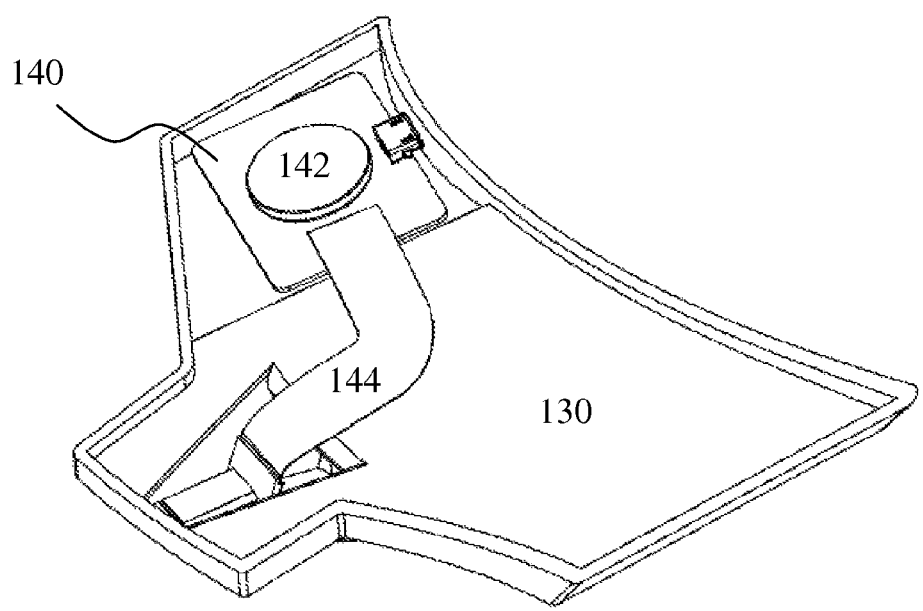
FIG. 3E is an enlarged top perspective view of a part of the image display assembly of FIG. 3.
Figure 4:
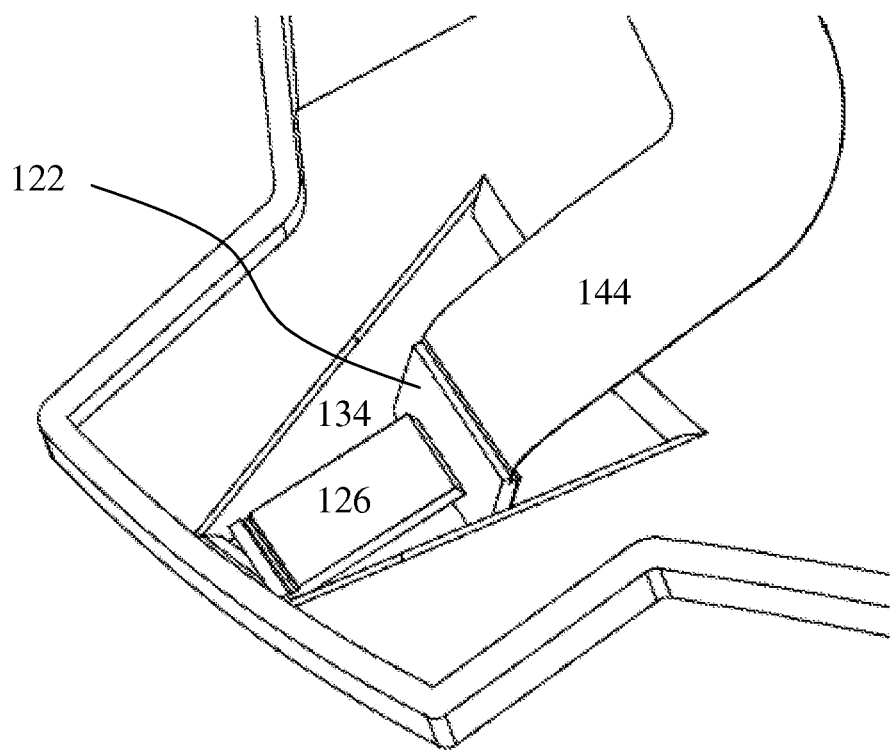
FIG. 4 is an enlarged view depicting another part of the image display assembly of FIG. 3.

As shown in more detail in FIGS. 3 to 3E, the backlight arrangement comprises a light collection panel 124 of a polycarbonate film of 0.3 mm thickness. The polycarbonate film comprises a light collection surface 124A and a light conduction layer 124B which is immediately below the light collection surface 124A. The light collection surface 124A and the light conduction layer 124B are integrally moulded of polycarbonate and the light conduction layer 124B is configured such that the ambient light collected by the light collection surface 124A will be trapped within the light conduction layer 124B by total internal reflection and travel within the light conduction layer 124B until finally emerging at the edges of the light conduction layer 124B.

To enhance visible light output, the polycarbonate film is doped with fluorescent colouring agents for converting incident light into light of a longer wavelength. The polycarbonate film available from Bayer® under the trade name Makrofol® and model number DE 1-1 CC (LISA) is used an example of such a light collection device and the product specification is incorporated herein by reference. The exemplary polycarbonate fluorescent films are available with absorption maxima at blue (370 nm), green (442 nm), yellow (462 nm), orange (521 nm), red (507 nm), dark red (519) and corresponding emission maxima respectively at 440, 521, 590, 595, 623 & 635 nm. Therefore, the backlight colour can be selected and/or mixed according to the desirable backlight colour. Where a white backlight is desired, a non-fluorescent polycarbonate film would be used.

Figure 5:
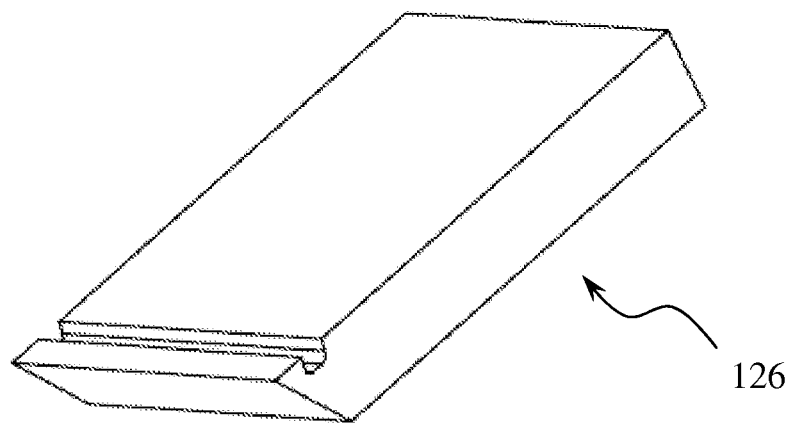
FIG. 5 is an enlarged perspective view showing a light guide of the image display assembly.

The polycarbonate film is cut into a light collection sheet and is laid with its widest surface facing upwards. This upward facing surface forms the light collection surface 124A and is adapted to face the ambient or sky for maximal light reception during use and when worn by a user. As shown more particularly in FIGS. 3 to 3E, the light collection film has an irregular shaped light collection surface and a tapered outlet end 124C. This narrowed outlet end 124C has the effect of concentrating collected light travelling within the light conduction layer 124B to emerge at the light outlet end 124C. A protective cover 128 is placed above the light collection surface 124A to protect the polycarbonate light collection surface 124A. The polycarbonate film is supported on the visor 108 of the cap 100 and forms part of the visor 108. This polycarbonate film extends forwardly from the rearward or proximal edge of the visor 108 and curves near the forward edge of the visor 108 to pass through the aperture 134 and enter the optical compartment. As a result of the curved reversal of the polycarbonate film at the forward visor edge, the narrowed outlet end 124C of the polycarbonate film will be underneath the visor 108 and directed toward the user. The curved and tapered output end of the polycarbonate film is received by a transversal slot formed on a light guide block to couple collected light to the light guide block as depicted in FIG. 5.

To couple light emerging from an output edge on the narrowed end 124C of the polycarbonate film, a light guide block 126 is placed between the light outlet of the polycarbonate film and the LCD display. This light guide block 126 is adapted to project back light onto the rear side of the LCD display to make images generated by the image forming circuitry on the LCD screen 122 visible.

The LCD display 122 is mounted within a light insulated rigid plastic housing 130. The plastic housing 130 forms a tunnel-like chamber with a viewing lens 138 placed at the viewing end and facing the eye of a user. As depicted in FIG. 3D, the LCD display is behind the viewing lens 138 and the light guide block 126 is behind the LCD screen 122, and light coming from the light collection panel 124 is projected onto the rear side of the LCD screen 122 to provide back illumination. The rigid plastic housing 130 has opaque walls to minimize light pollution from outside and to provide good contrast when viewing through the viewing lens 138.

A negative LCD screen 122 is used to enhance image contrast. As the image being displayed on a negative LCD 122 is transparent on an opaque background, a negative LCD screen 122 provides good image contrast especially when there is only limited back lighting illumination.

In use, the apparatus 100 is worn by a user with the LCD screen 122 positioned forward of and above an eye of a user. Upon activation by the user, the microprocessor will operate the wireless frontend device to obtain data from external sources such as GPS or mobile networks and processes the received data and information and to cause display of information on the LCD screen 122. As the polycarbonate film is placed with its widest light collection surface 124A facing upwards, ambient light is collected and concentrated for output at the edge of the tapered light outlet end 124C. Performance or physiological data or other relevant data such as instructions, proposed paths and maps, and tactical routes are generated by the microprocessor and displayed on the LCD screen 122 and become visible on the LCD screen 122 by the back light illumination. To view the information display, a user only needs to move an eyeball upwards for a short time to view the displayed information and then returns to the normal eyeball position for sporting.

To further provide image enhancement, a distal eye block is provided. As shown in the Figures, the display unit is adapted for left-eye viewing. To mitigate adverse vision interference due to image reception or image inception by the right eye, which is a distal eye as the left eye is a proximal eye with respect to the display unit, a light mask 150 as an example of a light block is suspended downwardly from the visor 108 at a position corresponding to forward projection of the right eye. This light shield 150 is made of an opaque material which extends downwardly from the visor 108. The downward extension is such that it does not block the normal vision of the right eye during normal activities, but will block the right-eye vision when the right eye balls moves in synchronization with the left eye ball to view the screen. Such a light block will have a similar effect of closing the right eye when the left eye is viewing the display screen.

Figure 6:
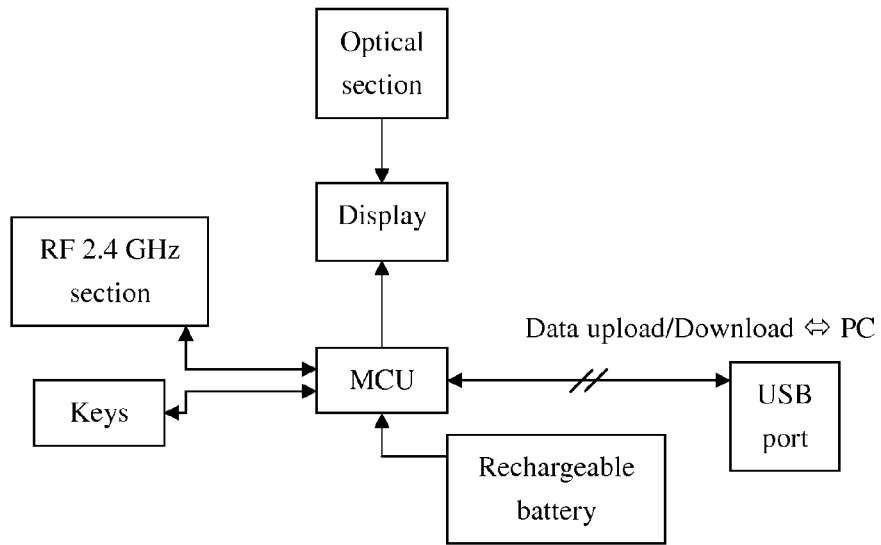
FIG. 6 is a block diagram showing an exemplary electronic circuitry of the image display assembly of FIG. 3.

The exemplary block diagram of FIG. 6 depicts an exemplary electronic circuitry of the image display assembly 120 of FIG. 3. The electronic circuitry comprises a liquid crystal display which is connected to a micro-processor as an example of a micro-controller unit (MCU). The MCU is powered by a rechargeable battery and connected to an RF frontend as an example of a telecommunications frontend such as a GPS module, a mobile phone module or a WiFi module. A keypad is provided to provide manual interface to the MCU, for example, for changing operation mode or display mode, for setting or entering set data, or for resetting the device. A USB data interface is also connected to the MCU to facilitate data exchange with an external computer. The USB also serves as a battery charging port to facilitate recharging of the battery by an external battery charger. The optical unit provides back lighting to the display. As an option, the battery could also serve as a backlight source to provide optional standby backlight to the display when ambient light is not available or is not adequate for screen illumination. Therefore, the optical display could be back illuminated by light from the ambient light collector or by the internal battery powered backlight source or a combination of both.

Figure 7:
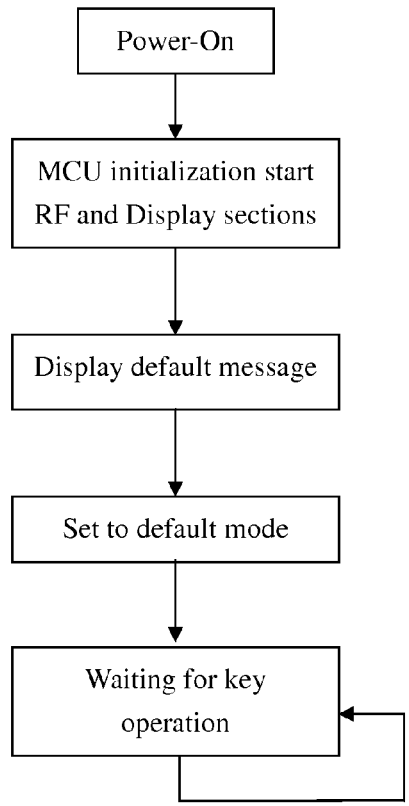
FIG. 7 is an exemplary flow chart illustrating an exemplary operation flow of the electronic circuitry of FIG. 6.

As shown in FIG. 7, when the electronic circuit is powered on, the MCU will initialize the display unit and the RF frontend. The initialization would include a default message to be displayed on the LCD screen 122, which image becomes visible upon back light illumination. The MCU will set the device to a predetermined default operation mode such as jogging mode, hiking mode, skiing mode cycling mode. After the device has been initialized, the MCU will await further key inputs as appropriate.

In another example, the apparatus comprises a lens, such as a camera lens, for collecting images ahead, behind or surrounding a user so that conditions ahead, behind or surrounding a user can be viewable from the display without the need to turn around the head of a user. The lens may be in addition or as an alternative to the wireless communication device.

While examples of the present inventions have been explained with reference to the examples above, the embodiments are non-limiting examples for illustrating the present invention(s) and should not be construed to limit the scope of the invention. For example, while the above embodiments have been explained with reference to a fluorescent polycarbonate film, it should be appreciated that other light collection devices could be used without loss of generality. Likewise, while a light guide block 126 is used to couple light from the light collection member to the LCD screen 122, it should be appreciated that the light guide block 126 is optional and can be replaced by an integral light guide extending from the light collection panel. In addition, while a negative LCD display has been used in the embodiment, it should be appreciated that a normal or positive LCD screen 122 could also be used without loss of generality. While an apparatus 100 in the form of a cap has been described, the cap may be replaced by a helmet, a hat, or a goggle, such as a swim goggle or a skiing goggle to suit different purposes without loss of generality.

Furthermore, while examples described above include an additional light mask 150 as an eye block for blocking incident light on the right eye when the right eye ball is moved upwards in response to left eye ball movement, it would be appreciated by persons skilled in the art that this additional light mask 150 is not essential.

TABLE OF NUMERALS

| | |
|---|---|
| 100 | Wearable communication apparatus |
| 102 | Forehead portion |
| 104 | First arm portion |
| 106 | Second arm portion |
| 108 | Visor portion |
| 110 | Receptacle |
| 120 | Image display assembly |
| 122 | Display panel |
| 124 | Light collection panel |
| 126 | Light guide |
| 128 | Protective cover |
| 130 | Plastic moulded housing |
| 132 | Base plate member |
| 134 | Aperture |
| 136 | Tabular portion |
| 138 | Viewing lens |
| 140 | Printed circuit board |
| 142 | Battery |
| 144 | Signal cable |
| 150 | Light mask |

The invention claimed is:

1. A mobile image display apparatus comprising a backlit display device, an ambient light collector, an image forming device for outputting image signals to form images on an image display screen of the backlit display device, and an image viewing chamber defined by an opaque housing; wherein the ambient light collector is for collecting ambient light from exterior surroundings to provide back illumination to the backlit display device and comprises a light collection panel, the light collection panel having a light collection surface for collecting ambient light and being of the type that collects light at an incident angle to a light collection surface and conveys the collected light in a direction parallel to the light collection surface.

2. A mobile image display apparatus according to claim 1, wherein the viewing chamber provides an optical isolation environment to shield the image display screen of the backlit display device from ambient light of the exterior surroundings.

3. A mobile image display apparatus according to claim 2, wherein the viewing chamber comprises a tubular portion extending forward of the image display screen to define a viewing end and a viewing axis, the viewing end being mounted with a viewing lens such that images on the image display screen is viewable by a user through the viewing lens when the backlit display device is backlit by the collected ambient light.

4. A mobile image display apparatus according to claim 2, wherein the apparatus comprises a light shade to shade the viewing end of the optical enclosure from the ambient light of the exterior surrounding.

5. A mobile image display apparatus according to claim 1, wherein the light collection panel comprises a light conduction layer which is underneath the light collection surface, the light conduction layer comprising light guides for guiding light collected by the light collection surface to move following the profile of the light collection panel and to leave the light conduction layer at a light output end.

6. A mobile image display apparatus according to claim 5, wherein the light guides terminate at an edge of the light conduction layer, the edge of the light conduction layer defining an output end of the light collection panel such that light collected by the light collection surface leaves the light collection panel at a direction tangential to the light output end of the light collection panel.

7. A mobile image display apparatus according to claim 6, wherein the light collection panel tapers towards the light output end to provide a condensed light output for back illumination of the backlit display device.

8. A mobile image display apparatus according to claim 1, wherein the light collection panel forms part of the light shade and is bent at the light collection end to provide back illumination to the backlit display device.

9. An image display assembly according to claim 1, wherein the light collection surface and the light conduction layer are integrally formed.

10. An image display assembly according to claim 1, wherein the light conduction layer is arranged to keep the collected ambient light within the light conduction layer by total internal reflection until edge emergence at the light output end.

11. An image display assembly according to claim 1, wherein the light conduction layer is doped with fluorescent coloring agents, the fluorescent coloring agents converting incident light into light of a longer wavelength.

12. A mobile image display apparatus according to claim 1, wherein the opaque housing defines a panel support for holding the light collection panel, the support also defining a light shade to shade the viewing end of the optical enclosure from the ambient light of the exterior surrounding.

13. A mobile image display apparatus according to claim 12, wherein the panel support and the viewing chamber are integrally formed such that the viewing chamber is downwardly dependent from the panel support and overhanging the panel support.

14. A mobile image display apparatus according to claim 1, wherein the apparatus comprises a wireless frontend for receiving information and a processor executing stored instructions to process the received information for displaying on the image display screen.

15. A headwear such as a cap, a helmet or hat or an eyewear such as goggles such as swimming and skiing goggles comprising a mobile image display apparatus according to claim 1 and a visor for attaching to a user, wherein the mobile image display apparatus is mounted on and/or suspended from the visor, and the light collector is mounted on the visor with the light collection surface exposing through the visor, wherein the image viewing chamber is underneath the visor when worn.

16. A headwear or an eyewear according to claim 15, wherein the image display unit is positioned immediately above the eye-level of a user such that the image display unit does not obstruct normal vision of a user.

17. A headwear or an eyewear according to claim 15, wherein the backlit display device is adapted for viewing by a proximal eye and the head wear further includes a distal eye vision block which is arranged to block the vision of a distal eye when the eye ball of the proximal is moved to view the display unit.

18. A headwear or an eyewear according to claim 17, wherein the distal eye vision block comprises a light shield which projects downwardly from the underside of the visor, the depth of the light shield being such that the vision of the distal eye is not obstructed until the eye ball of the distal eye is moved upwards in synchronization with the upward viewing movement of the proximal eye ball.

* * * * *